Figure 3:
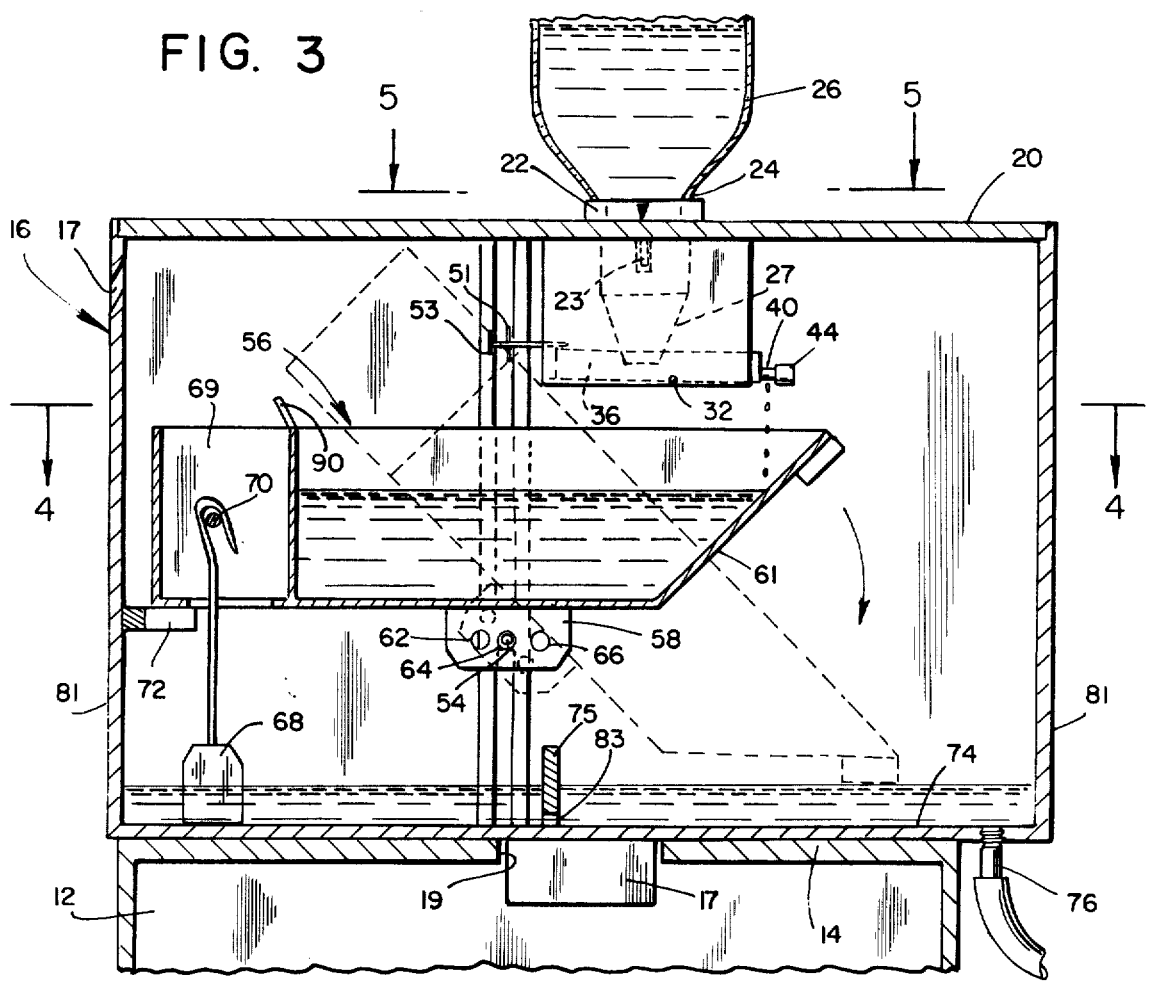

United States Patent

Roos

[11] 4,042,150
[45] Aug. 16, 1977

[54] WATER GRAVITY PLANT FEEDER

[76] Inventor: Hans Walter Roos, 235 Mount Hope Place, Bronx, N.Y. 10457

[21] Appl. No.: 672,299

[22] Filed: Mar. 31, 1976

[51] Int. Cl.² .................................... A01G 27/00
[52] U.S. Cl. .................................... 222/70; 47/79; 222/166; 222/463; 222/482
[58] Field of Search ............... 119/78, 81; 47/38, 79; 222/57, 58, 70, 77, 164, 166, 181, 185, 463, 482, 485, 486

[56] References Cited

U.S. PATENT DOCUMENTS

| 3,125,255 | 3/1964 | Kaiser | 222/181 X |
|---|---|---|---|
| 3,168,224 | 2/1965 | Rios | 222/181 |
| 3,223,284 | 12/1965 | Fann | 222/57 |
| 3,467,280 | 9/1969 | Cyphert | 222/57 |

Primary Examiner—Robert B. Reeves
Assistant Examiner—David A. Scherbel
Attorney, Agent, or Firm—Jacob L. Kollin

[57] ABSTRACT

A water gravity plant feeder comprising a housing, water bottle mounted on said housing, and a device for supplying water from the bottle to plants arranged adjacent the housing. The watering device comprises a feed tray positioned under the water bottle for supplying a measured volume of water at predetermined intervals to a water trough. When full, water is spilled from the trough into a sump in the housing, whence it flows into a water distributor for watering a plurality of plants.

7 Claims, 9 Drawing Figures

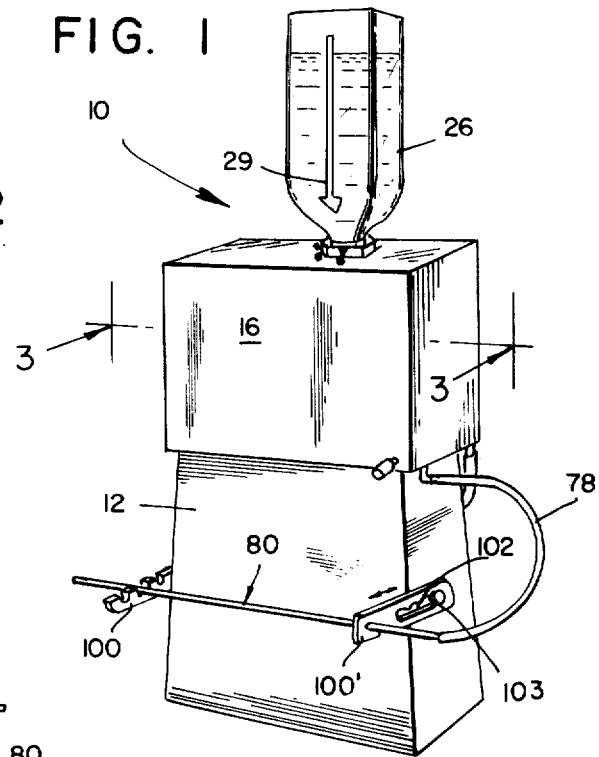
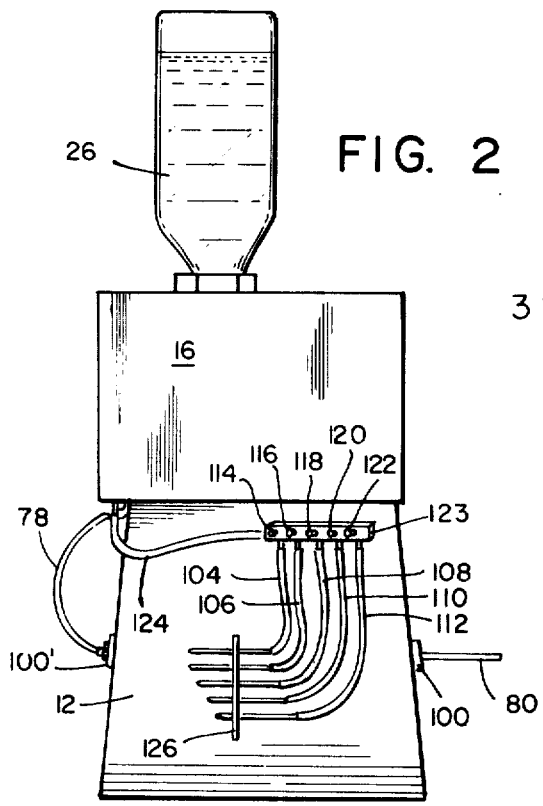
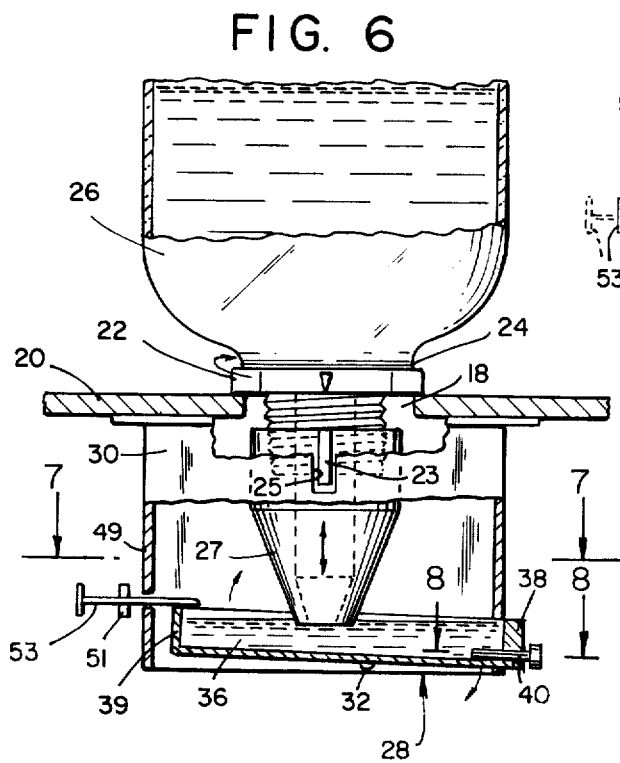
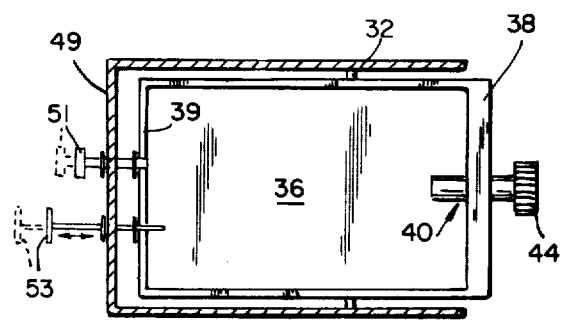
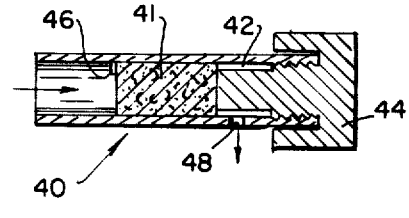

WATER GRAVITY PLANT FEEDER

BACKGROUND OF THE INVENTION

The invention relates to devices for feeding water to plants in general and in particular to an automatic water gravity plant feeder.

An object of the invention is to provide a water gravity plant feeder which will automatically dispense water at predetermined intervals and amounts to one or a plurality of plants.

Another object of the invention is to provide a device of the above character which is operated by water gravity.

A further object of the invention is to provide an automatic water gravity plant feeder provided with means for presetting the amounts and intervals of gravity water feeding for an extended time period to obviate frequent attention usually required on the part of the plant owner.

These and other objects of the invention will become apparent from the following description in connection with the appended drawing illustrating a preferred embodiment of the invention. It is to be understood, however, that these are given by way of illustration and not of limitation and that changes may be made in the detail, construction, form and size of the parts, without affecting the scope of the invention sought to be protected.

IN THE DRAWINGS

Figure 4:
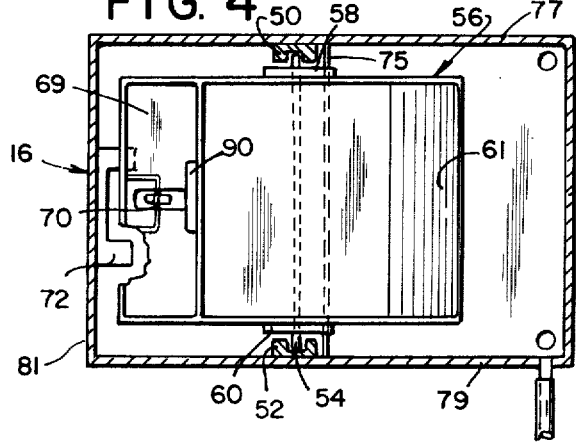
Figure 5:
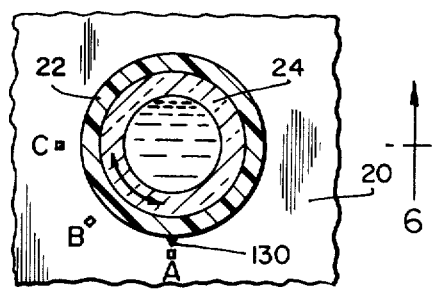
Figure 9:
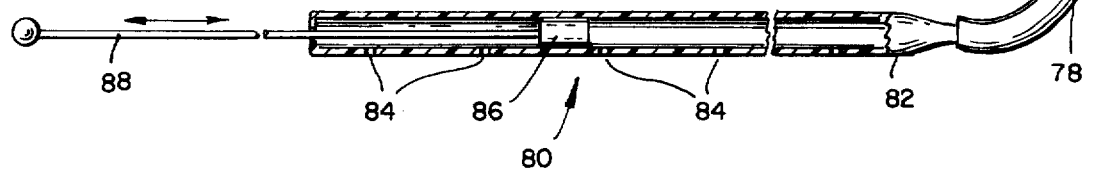

FIG. 1 is a perspective view of the device,
FIG. 2 is a rear elevation thereof,
FIG. 3 is an elevational cross-section of the device,
FIG. 4 is a cross-section taken on line 4—4 of FIG. 3,
FIG. 5 is a cross-section taken on line 5—5 of FIG 3,
FIG. 6 is an enlarged partial section of the liquid dispensing mechanism of the device, taken on line 6—6 of FIG. 5,
FIG. 7 is a cross-section on line 7 of FIG. 6,
FIG. 8 is a cross-section taken on line 8—8 of FIG. 6,
FIG. 9 is a cross-section of the distributing tube of the device.

Referring now to the drawings in detail, the device according to the invention, generally indicated as 10, comprises a base 12 having a top wall 14 on which is detachably mounted a housing 16, positioned by means of a block 17 secured to the bottom of the housing and which fits into an opening 19 in the top wall 14.

As shown in the cross-sectional views of FIGS. 3 and 4, the housing 16 is provided with a circular opening 18 in its top wall 20, surrounded by an integral ring 22, into which fits the neck 24 of an inverted bottle 26. A guide strip 23 is provided in the opening 18 and engages with a slot 25 of a nozzle 27, thus preventing the nozzle from turning in the opening 18. The nozzle 27 is in threaded engagement with the neck 24 of the bottle 26. The bottle is provided with a vertical pointer 29, while ring 22 has three position marks, as shown in FIG. 5. By rotating the neck of bottle 26 in nozzle 27, the bottle can be moved up or down. An air vent 17 is provided in the housing 16.

Secured to the top wall 20 of the housing is a feed tray mechanism, generally indicated by the arrow 28. The feed tray is formed with a bottom 36, a front wall 38 and a rear wall 39. A spout 40 extending through the front wall 38, is provided with a filter 41. The spout has an interior thread 42 in which is received a plug 44, which can be unscrewed to permit the removal of the filter when it is to be changed. The spout is further provided with an interior circular projection 46 to prevent the filter from rearward movement. A drip hole 48 is provided in the spout.

Slidably mounted in the rear wall 39 of the feed tray 34 is a threaded pin 51 which functions to hold the feed tray in a slightly tilted position to prevent its forward wall 38 from tilting downward before starting the operation of the device. Additionally a pin 53 is provided in wall 49 for adjusting and maintaining the feed tray in a predetermined position.

A tiltable water trough 56 provided with pivot platts 58, 60, one of which is shown in FIG. 3, is mounted on a pivot rod 54 which is removably mounted transversely of frame members 50, 52. The pivot plates are provided each with aligned pairs of holes, such as 62, 64, 66, through each pair of which may be exchangeably inserted the pivot rod 54. By inserting the rod 54 in a desired pair of pivot holes the amount of water required to tilt the trough 56 may be varied. Thus, as shown in FIG. 3, water trough 56 is in a horizontal position with the water at the level shown in that Figure. A counterweight 68 is supported on the bottom of the housing, but does not engage pivot 70 until the trough starts tilting downward, as shown in the FIG. 3, due to an excess of water over the level shown as a solid line in that Figure. It will be noted that the trough is formed with an inclined wall, forward wall 61, so that the weight of the water in the forward part of the container is greater than the volume and weight of the water in the posterior part thereof. Thus, when the water exceeds a certain level above a preset one, the weight of the water in the forward part of the trough exceeds the weight of the water in the posterior part and causes the trough's forward part to tilt downwardly into the position shown by dotted lines in FIG. 3. The water will spill from the container into the sump 74 located in the bottom portion of housing 16. The sump 74 is formed by wall 81. Side walls 77, 79 and end wall 81, it also has a partition 75. An aperture 83 is provided in the partition to prevent turbulence from forming in the sump when the latter is being filled.

There is provided a plant watering rigid distributor 80 consisting of a plastic tube 82, mounted on the front side of the base, provided with a plurality of spaced drip holes 84 and a slidable piston 86 secured to one end of a rod 88. By sliding the piston in either direction, the number of drip holes 84 may be closed off or opened, depending on the number of plants to be watered. As shown in FIG. 1, the plastic tube 82 is mounted on a pair of brackets 100, 100'. The brackets are formed with slots, such as 102, which permit their displacement forward, rearward, upward and downward on knob 103 to adjust the position of tube 82 for various heights and diameters of house plant containers to be watered.

In addition to the distributor 80, which may be spaced above the plants to be watered, there is a further provided on the back side of the base 12 a plurality of flexible tubes 104 106, 108, 110 and 112, for watering plants by inserting the nozzles directly into containers of various sizes. The flexible tubes 104, 106, 108, 110 and 112 communicate via on-and-off values 114, 116, 118, 120, 122, respectively, mounted on a block 123 secured to the back of the base 12, communicating with the outlet in sump 75 by means of tubing 124. When not in use, the tube, nozzles are stored in a holder 126, likewise secured to the back of base 12.

OPERATION OF THE DEVICE

The base 12 is positioned on a suitable surface, such as a floor, table or the like, and the housing 16 emplaced thereon. The base 17 at the housing bottom 21 is inserted into the matching opening 19 in the top 23 of the base.

A half-gallon bottle 26 is filled with water and nozzle 27 is screwed onto the neck 24 as far as it will turn, in clockwise direction, viewed from above the top of the bottle. The nozzle is turned counterclockwise 2½ turns; the bottle is turned upside down and nozzle 27 inserted in the opening 18 with the guide strip 23 fitted into slot 25 of the nozzle. The volume of water desired to flow through the nozzle into the feed tray is preset by rotating the bottle to align one of the marking A, B or C on the top side shown in FIG. 5 with the pointer 130, on the ring 2, corresponding to ⅛, ¼ and ⅜ of a turn. It will be appreciated that the volume of water flowing into the feed tray through the nozzle will vary depending upon the degree of turning the bottle relative to the nozzle. As an example, in the present embodiment the nozzle opening is 9/16 inch, using a ½ gallon bottle. When the nozzle is unscrewed 2½ turns to its "basic" (closed) position, a half-pint of water will be supplied to the plants for about 6 days. The device can also be adjusted to water plants twice a week by appropriate setting of the bottle.

When the water-filled bottle is first inserted in the opening 18, the water will drip from the bottle into the feed tray 36. When water in the tray will have reached the nozzle opening, the water will stop dripping from the bottle. The water will, however, continue to drip into the trough 56. After the feed tray 36 is partially emptied, the water from the bottle will resume flowing into the feed tray. This cycle will continue until the water issuing through drip hole 48 of the feed tray will have filled the trough 56 in sufficient amount to tilt trough 56 downward. This will cause the trough to tilt downward with its forward part and spill the water from the trough into sump 74. At the same time the extension 90 on the back of the trough will push pin 53 inward of feed tray 36 unvail to set the desired position of the feed tray to regulate the speed at which the water will flow from bottle 26 into the feed tray. The greater the forward inclination of the feed tray the faster will the water drip into the trough. The adjusting pin 53 will thence from remain in the adjusted position, while the trough will return to its original position shown in solid lines in FIG. 3. The back of the feed tray will move down about 1 mm from the start position, and the front will move up.

Water from the sump will flow out through outlet 76, flexible tubing 78 to distributor 80 and through the openings in the distributor to the plants arranged below it.

When it is desired to water plants grown in containers of various heights and sizes, the flexible tubes 104, 106, 108 110, 112 may be used. In this case the tube valves 114, 116, 118, 120 and 122 are opened for the desired flower containers and the valves for the respective flexible tubes are opened.

I claim:

1. A water gravity plant feeder comprising a housing, including a base having a front, side and a back side, a water container mounted on top of said housing, said top having an aperture for inserting said threaded neck therethrough, a water tray adjustably mounted in said housing beneath said aperture, a trough swingably mounted in said housing below said water tray, means in said water tray for delivering water in predetermined amounts to said trough, a sump positioned below said trough, said trough being tiltable to deliver water to said sump when a predetermined volume of water is reached in said trough, causing said trough to tilt by gravity first water distributing means for watering plants, secured to said front side and second water distributing means for watering plants, secured to said back side.

2. The plant feeder as claimed in claim 1, wherein said water container has an exteriorly threaded neck and an interiorly threaded cover having an aperture therethrough for the passage of water, said cover having an outer groove and a detent strip integral with the edge of said opening engaging in said groove, for preventing the rotation of said threaded cover, said container neck being vertically displaceable in said cap by rotating said container.

3. The plant feeder as claimed in claim 2, wherein said housing is provided with a pair of spaced vertical supports, said water tray being pivotably mounted intermediate said supports at a predetermined distance from said cover, said water tray comprising a forward portion having a spout extending therefrom and provided with a drip hole, a rear portion, a balance rod slidable therethrough for maintaining the water tray at said predetermined distance from said cap and a removable screw in said rear portion for cleaning out said water tray.

4. The plant feeder as claimed in claim 3, wherein said trough is formed with an inclined forward wall, a pair of side walls, a rear wall and an open top, a pair of adjusting plates integral with said side walls, pivot means for said plates, said plates having a plurality of pivot holes for selective engagement with said pivot means, a counter weight secured to said rear wall for balancing said trough in a predetermined position and an upwardly directed extension on said rear wall engageable with said balance pin, when said rear wall is tilted upwardly.

5. The plant feeder as claimed in claim 4, wherein said sump is provided with a divider having an aperture therethrough.

6. The plant feeder as claimed in claim 4, wherein said first distributing means comprises a rigid tube, said tube having a plurality of spaced drip holes and communicating with said sump, adjustable bracket means for supporting said tube horizontally on said base and a piston slidable in said tube for closing off a selected number of said drip holes.

7. The plant feeder as claimed in claim 4, wherein said second distributing means comprises a plurality of tubes of flexible material means communicating one end of each of said tubes with said sump, shut-off valves for each of the respective of said tubes, nozzles secured to the other ends of said tubes and a bracket for supporting said free ends of the tubes.

* * * * *